Jan. 11, 1966  G. J. ZAHRADNIK  3,228,498
DRIVE PULLEY AND CLUTCH FOR DUPLICATING MACHINES
Filed Feb. 14, 1963

INVENTOR.
George J. Zahradnik
BY Ooms, McDougall & Hersh
Att'ys

United States Patent Office 3,228,498
Patented Jan. 11, 1966

3,228,498
DRIVE PULLEY AND CLUTCH FOR
DUPLICATING MACHINES
George J. Zahradnik, North Riverside, Ill., assignor to
A. B. Dick Company, Chicago, Ill., a corporation of
Illinois
Filed Feb. 14, 1963, Ser. No. 258,593
1 Claim. (Cl. 192—46)

This invention relates to a new and improved mechanism which may be employed for driving a duplicating machine or the like.

One object of the present invention is to provide a new and improved V-belt pulley which affords an improved grip on the V-belt, yet is extremely low in cost.

A further object is to provide a new and improved pulley of the foregoing character which is formed in a new and improved manner from a single piece of sheet metal or the like.

It is a further object of the present invention to provide a new and improved V-belt pulley which comprises a circular sheet metal disk having its edge portion slotted to form teeth or fingers which are bent alternately in opposite directions at an acute angle relative to the plane of the disk.

A further object of the present invention is to provide a new and improved clutch of the type which is disengaged when the drive mechanism is idle but is adapted to become engaged automatically when the drive motor is started.

Another object is to provide a new and improved clutch of the foregoing character which provides a fully positive drive as soon as the clutch is engaged.

A further object is to provide a new and improved clutch of the foregoing character which is engaged initially by the effect of acceleration and is held in engagement during normal operation by centrifugal force.

Another object is to provide a new and improved clutch of the foregoing character which is extremely effective in operation yet is highly economical in construction.

Further objects and advantages of the present invention will appear from the following description, taken with the accompanying drawings, in which.

Figure 1:
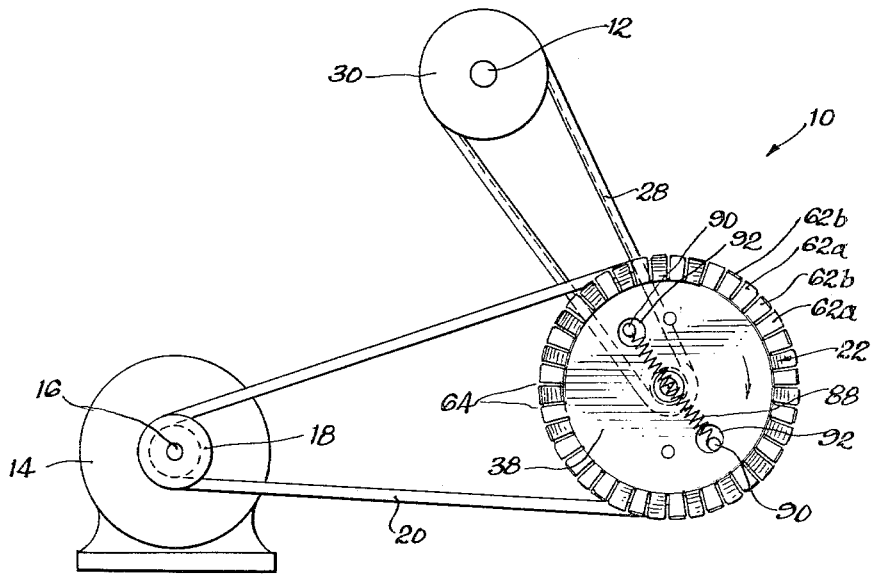
FIG. 1 is a somewhat diagrammatic, general elevational view showing a drive mechanism to be described as an illustrative embodiment of the present invention.

It will be seen that FIG. 1 illustrates a driving mechanism 10 which may be employed to advantage in connection with a duplicating machine, or various other types of machines. The general purpose of the drive 10 is to rotate a main shaft 12, to which a duplicating cylinder (not shown) or the like may be connected.

Power to rotate the shaft 12 may be derived from an electric motor 14 having a shaft 16. A suitable V-belt pulley 18 may be mounted on the shaft 16.

As shown in FIG. 1, a V-belt 20 is threaded around the pulley 18 and also around a larger V-belt pulley 22, to be described in greater detail shortly. An automatic clutch 24 is adapted to connect the pulley 22 to a rotatable hub 26. In this case, a second belt 28 is looped around the hub 26 and also around a pulley 30 secured to the shaft 12. The pulley 30 is larger in diameter than the hub 26 so that the shaft 12 rotates at a slower speed than the hub 26.

The belt 28 may be of any desired construction, but, as illustrated, is of the type having a plurality of V-shaped ridges 32 adapted to engage the pulley 30 and the hub 26. To receive the belt 28, the hub 26 has a pulley portion 34 formed with a plurality of annular V-shaped grooves 36 for receiving the V-shaped ridges 32. The hub 26 may be made of a strong durable wear-resistant plastic material, such as a reinforced nylon material, for example.

During normal operation, the hub 26 is coupled to the pulley 22 by the clutch 24. However, the pulley 22 itself is rotatably mounted on the hub 26. In this case, the pulley 22 is made in a single piece from sheet metal or the like. Thus, the pulley 22 comprises a circular metal disk 38 having a central opening 40 formed therein. The hub 26 has a reduced end portion 42 which is rotatably received within the opening 40 in the disk 38. A spring clip or ring 44 may be employed to retain the disk 38 on the reduced portion 42. It will be seen that the clip 44 is removably received in an annular groove 46 formed in the reduced portion 42.

As shown, the hub 26 is formed with an axial bore 48 which is rotatably received around a stud or shaft 50. In the illustrated construction, one end of the stud 50 is riveted or otherwise rigidly secured to a frame plate 52. The hub 26 may have an end face 54 which is slidably engageable with a shoulder 56 on the stud 50. The hub 26 may be retained on the stud 50 by a spring clip or ring 58 which is received in a groove 60 formed in the end of the stud 50.

To engage and grip the V-belt 20, the illustrated pulley 22 is formed with radial fingers or tabs 62a and 62b, comprising integral elements of the circular disk 38. It will be evident that the tabs 62a and 62b are separated by a large number of radial slots 64 formed in the edge portion of the circular disk 38. The tabs 62a and b are bent alternately in opposite directions at acute angles from the plane of the circular disk 38, so that the tabs effectively provide a groove 66 to receive the V-belt 20. Thus, the tabs 62a provide slanting surfaces 68a which support one side of the V-belt 20. Similarly, the tabs 62b provide slanting surfaces 68b which support the other side of the V-belt 20. There is a wedging action between the V-belt and the slanting surfaces 68a and b so that the belt is tightly gripped by the tabs 62a and b. The concentration of the wedging forces at the individual tabs provides a particularly efficient gripping action between the pulley and the V-belt.

The clutch 24 disconnects the pulley 22 from the hub 26 when the pulley 22 is stationary. In this way, the starting torque required of the motor 14 is greatly reduced. However, the initial rotation of the pulley 22 by the motor 14 causes the clutch 24 to connect the pulley to the hub 26.

In this case, the clutch 24 comprises a ratchet wheel 70 which may be formed integrally with the hub 26. The illustrated ratchet wheel 70 has five equally spaced ratchet teeth 72.

To engage the ratchet wheel 70, two diametrically opposite ratchets or pawls 74 may be mounted on the pulley 22. It will be seen that each pawl 74 is swingable about an individual pivot pin 76 which may be riveted or otherwise rigidly secured to the disk portion 38 of the pulley. Each pawl 74 may be retained on the corresponding pivot pin by a spring clip 78. It will be seen that each pawl or ratchet 74 is formed with a tooth 80 adapted to hook onto any of the ratchet teeth 72.

In this case, the clutch pawls 74 are adapted to be actuated by both acceleration and centrifugal force. Thus, each pawl 74 constitutes one arm of a lever 82 having a second arm 84. A weight 86 is formed integrally with or mounted on the outer end of the arm 84. Each clutch pawl 74 is adapted to be engaged with the ratchet wheel 70 by clockwise movement of the pawl about its pivot 76. The pawl is disengaged from the ratchet wheel by counterclockwise movement of the pawl about the pivot.

Figure 3:
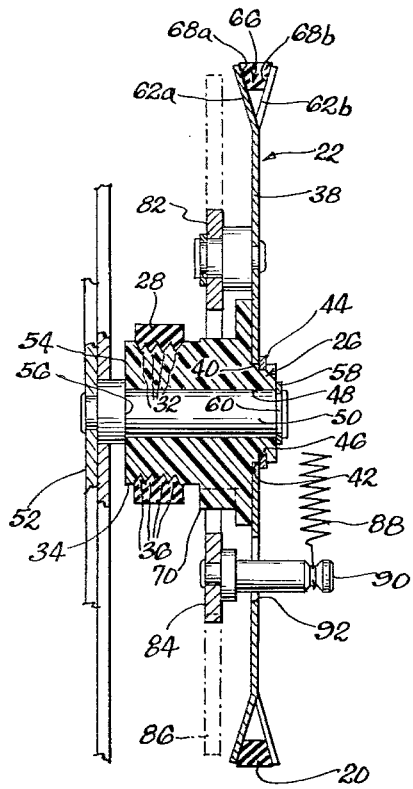
FIG. 3 is an enlarged sectional view taken generally along the broken line 3—3 in FIG. 2.

When the pulley 22 is stationary, the pawls 74 are biased out of engagement with the ratchet wheel 70 by a spring 88 which is stretched between pins 90 secured to the lever arms 84. As shown to advantage in FIG. 3, the pins 90 may extend through clearance slots or openings 92 in the disk portion 38 of the pulley 22. Thus, the spring 88 may be disposed on the opposite side of the pulley 22 from the pawls 74 and the associated arms 84 and weights 86. The pins 90 are long enough to provide clearance between the spring 88 and the shaft or stud 50 on which the hub 26 is mounted. The weights 86 may be arcuate in shape and may be disposed opposite the outer edge portion of the pulley 22.

Figure 2:
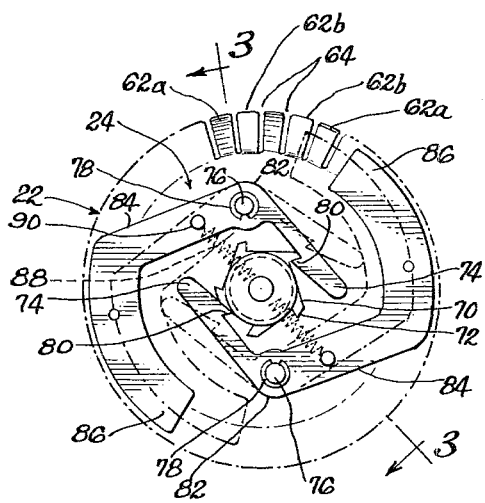
FIG. 2 is an enlarged elevational view showing a portion of the drive mechanism as viewed from the opposite side.

When the pulley 22 is stationary, the pawls 74 and the associated arms 84 and weights 86 are biased by the spring 88 to the positions shown in broken lines in FIG. 2. Thus, the weights 86 are swung inwardly, while the pawls 74 are swung outwardly away from the ratchet wheel 70.

When the motor 14 is started, the pulley 22 is rotated in a counterclockwise direction, as seen in FIG. 2. The motor 14 rapidly accelerates the pulley 22. The inertia of the weights 86 and the arms 84 causes the levers 82 to be swung clockwise about the pivot 76, relative to the pulley 22. Such clockwise movement of the levers 82 moves the pawl 74 inwardly against the ratchet wheel 70. The tooth 80 on one of the pawls 74 engages one of the teeth 72 on the ratchet wheel 70 so as to establish a driving connection between the pulley 22 and the hub 26. Thus, the hub is set into rotation in unison with the pulley 22. Inasmuch as there are two pawls 74 and five ratchet teeth 72, the other pawl engages the ratchet wheel 70 with the tooth of the pawl substantially half way between a pair of adjacent ratchet teeth 72. Thus, there are are actually ten possible driving positions of the pulley 22 relative to the ratchet wheel 70. By employing only five ratchet teeth 72, the teeth can be made larger and stronger so that the clutch will be extremely reliable and durable.

During the starting of the pulley 22, the forces on the weights 86 due to acceleration maintain the weights in their outwardly swung positions, as shown in full lines in FIG. 2. As the pulley 22 approaches its normal operating speed, the weights 86 are held outwardly by centrifugal force. Thus, the weights 86 are maintained in their outwardly swung positions until the motor 14 is stopped. Thus, the pawls 74 remain in engagement with the ratchet wheel 70 as long as the pulley 22 is driven at its operating speed.

It will be noted that each of the clutch levers 82 is curved in shape so that the weight 86 is generally on the opposite side of the axis of the pulley 22 from the pawl 74. Thus, the pawl 74 and the center of gravity of the corresponding weight 86 are on opposite sides of a line extending through the axis of the pulley 22 and the axis of the pivot pin 76 for the lever 82. Accordingly, the outward centrifugal force on the weight 86 causes the pawl to swing inwardly against the ratchet wheel 70. The center of mass of the lever 82 is disposed at a greater radial distance from the axis of the pulley than the distance between the pulley axis and the axis of the pivot pin 76, so that acceleration of the pulley 22 also causes the weight 86 to be swung outwardly relative to the pulley. Thus, the clutch is adapted to be actuated by both acceleration and centrifugal force.

It will be evident that the clutch is extremely effective and dependable in operation. Nevertheless, the clutch is easy to manufacture and low in cost.

Various modifications, alternative constructions and equivalents may be employed without departing from the true spirit and scope of the invention, as exemplified in the foregoing description and defined in the following claim.

I claim:

In a clutch,
the combination comprising a rotatable ratchet wheel,
a driving member rotatably mounted adjacent said ratchet wheel,
first and second diametrically opposite pawls mounted on said driving member for inward and outward movement into and out of engagement with said ratchet wheel for driving said ratchet wheel in a predetermined direction of rotation,
said ratchet wheel having an odd number of teeth thereon whereby only one of said pawls can be in driving relation to the corresponding tooth on said ratchet wheel at any one time,
the other pawl being spaced by one-half tooth from such driving relation,
spring means biasing said pawls outwardly away from said ratchet wheel,
first and second diametrically opposite pivots on said driving member,
first and second diametrically opposite massive clutch arms swingable about said pivots in response to both angular acceleration of said driving member and centrifugal force due to the rotary speed of said driving member,
each massive clutch arm extending in a direction relative to the corresponding pivot such that outward movement of said clutch arm away from the rotary axis of said driving member is produced by both centrifugal force and angular acceleration of said driving member in said predetermined direction of rotation,
and means connecting each of said massive clutch arms to one of said pawls for moving said pawl inwardly against said ratchet wheel in response to such outward movement of said clutch arm,
whereby each pawl is initially moved into engagement with said ratchet wheel by acceleration of said driving member in said predetermined direction and is maintained in engagement with said ratchet wheel by centrifugal force on said massive clutch arm due to the rotary speed of said driving member.

References Cited by the Examiner

UNITED STATES PATENTS

| | | |
|---|---|---|
| 328,887 | 10/1885 | Holmes. |
| 675,550 | 6/1901 | Meyerhoff _____ 74—219 X |
| 689,370 | 12/1901 | Slotkin _____ 192—41 |
| 697,166 | 4/1902 | Phelps et al. _____ 192—41 |
| 1,534,781 | 4/1925 | Horridge _____ 74—219 |
| 1,647,305 | 11/1927 | Peters. |
| 1,713,909 | 5/1929 | Marchev. |
| 1,767,593 | 6/1930 | Laabs. |
| 2,069,132 | 1/1937 | Clark. |
| 2,323,353 | 7/1943 | Plog. |
| 2,555,560 | 6/1951 | Timm. |

FOREIGN PATENTS

| | | |
|---|---|---|
| 320,743 | 8/1902 | France. |
| 1,160,565 | 3/1958 | France. |
| 801,048 | 9/1958 | Great Britain. |

DON A. WAITE, *Primary Examiner.*